Figure 1:
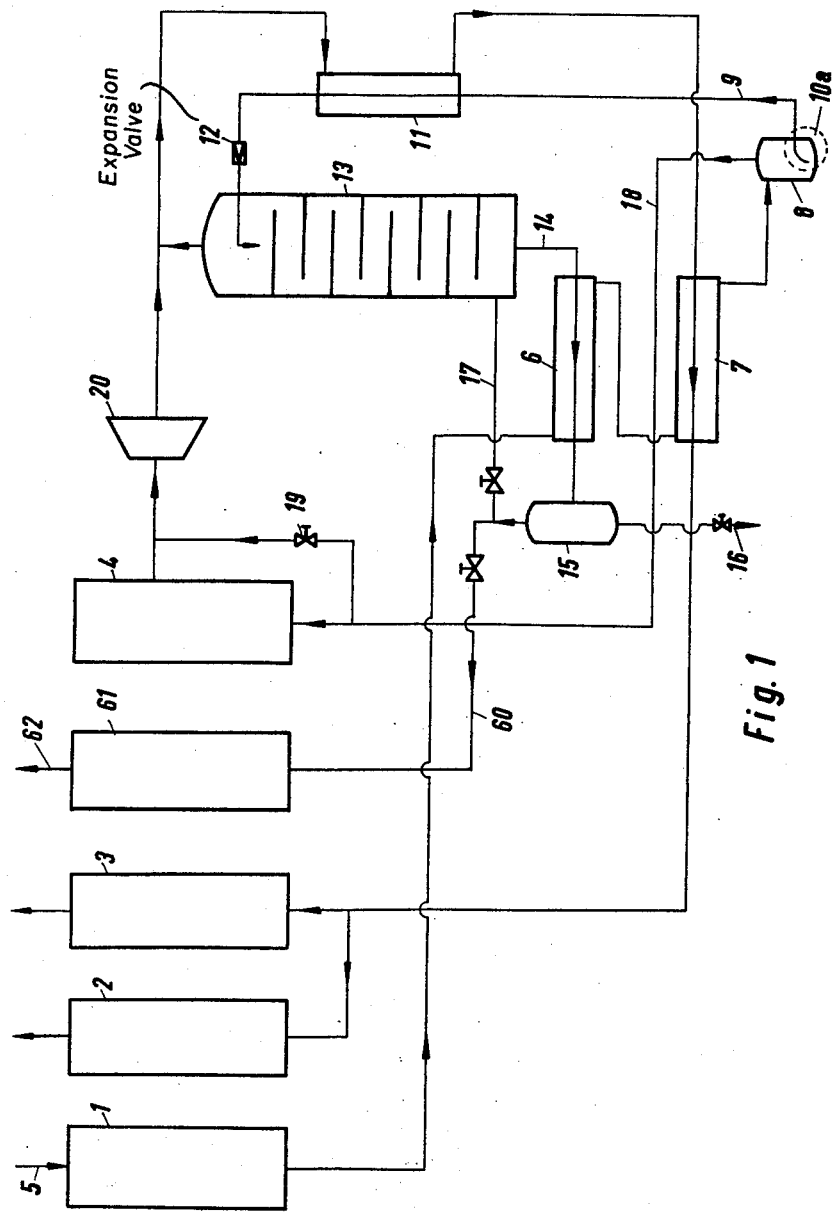

United States Patent Office 3,196,621
Patented July 27, 1965

3,196,621
METHOD OF SEPARATING AIR BY LOW TEMPERATURE RECTIFICATION
Rudolf Becker, Munich-Solln, Germany, assignor to Gesellschaft fur Linde's Eismaschinen Aktiengesellschaft, Hollriegelskrueth, near Munich, Germany, a company of Germany
Filed Dec. 16, 1960, Ser. No. 76,224
2 Claims. (Cl. 62—13)

This invention concerns a method for the low temperature separation of a mixture of gases, particularly for the production of liquefied gas separation products and preferably for the production of liquid oxygen in the separation of air. Furthermore, it is possible to cover with a plant operating according to the method of the invention the cold consumption of a gas separating plant in which no cold is produced, or to offset the increased cold losses of a plant with internal oxygen compression.

It is known to obtain liquefied gaseous separation products in high pressure plants which are operated at a pressure of about 150–200 atm. It is also known to withdraw smaller quantities of liquefied gases from low-pressure gas separating plants, where the additional cold required is produced by an increased gas circulation. These methods, however, are uneconomical for the production of larger quantities of liquefied gases.

Heretofore there has been proposed a method for the low temperature-separation of gas with a high cold consumption, which method permits the economical production of liquefied gaseous separation products by the application of pressures between 10 and 18 atm. abs., preferably between 12 and 15 atm. abs.

A major object of the present invention is the provision of a method which permits a reduction of the specific energy expenditure in the production of gas separation products, both as applied to the known low-pressure separation of a mixture of gases and particularly as applied to the suggested medium pressure separation of a mixture of gases, and which makes the production of liquid gas separation products more economical.

The invention is based on the discovery that in the separation of gas the amount of gas introduced into the rectifying column by throttling must be as small as possible, while the amount of gas to be expanded by work-producing means must be as great as possible, since the gain in cold is substantially higher by work-producing expansion. The amount of gas to be throttled down into the column is smallest, however, when its content of the material to be obtained is as high as possible.

In the case of the production of oxygen by separation of air, the upper limit of the oxygen content of the liquid is given by the return ratio liquid/vapor, which is about 1.35 to 1.4; that is, the oxygen content of the liquid is about 35 to 40%. When this limit is attained, neither injection of air nor washing of the column with nitrogen-rich liquid will increase the amount of pure oxygen per Nm.$^3$ (that is, the volume of one cubic meter, measured at a pressure of 760 mm. Hg and at a temperature of 0° C.) liquid throttled down into the column. This will be shown by the example of a balance of the distilling column 13, shown in FIG. 1, for the production of pure liquid oxygen.

Figure 2:
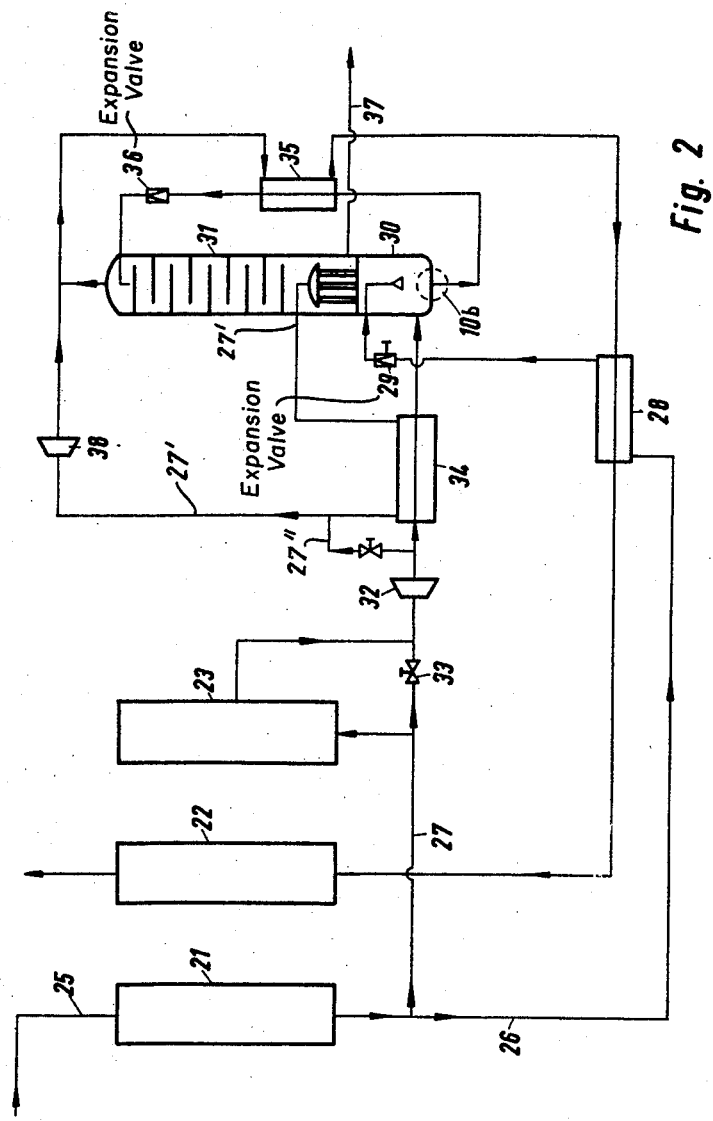
Figure 3:
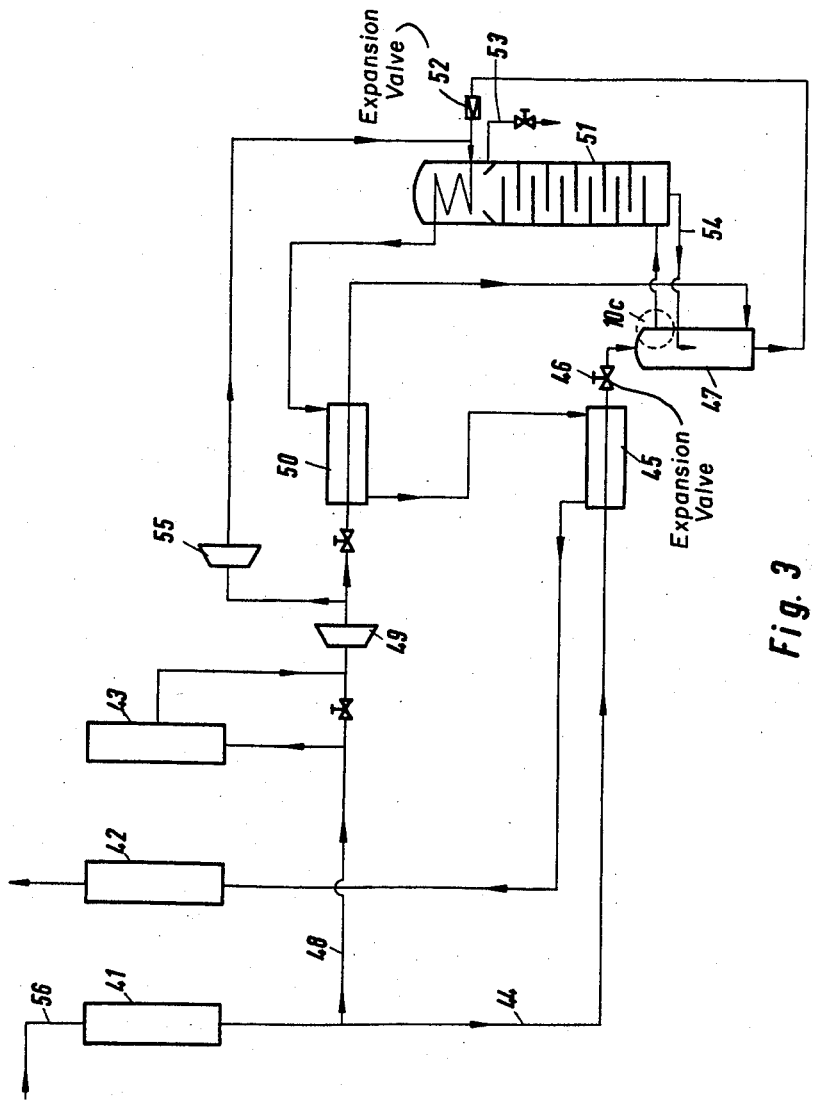

In the accompanying drawing:

FIG. 1 is a diagrammatic representation of a plant for the carrying out of the hereindescribed process in the production of liquid oxygen;

FIG. 2 diagrammatically represents a generally similar plant which, however, is designed to be operated at a pressure somewhat higher than that at which the plant shown in FIG. 1 is designed to be operated; and FIG. 3 diagrammatically represents a plant similar to that shown in FIG. 1 but adapted to the production of liquid nitrogen.

In the assumed example—here referring to FIG. 1—3500 Nm.$^3$/h. (that is, 3500 cubic meters, measured at a pressure of 760 mm. Hg and at a temperature of 0° C., per hour) (i.e., 123,600 cubic feet per hour) liquid with 40% oxygen is fed to the distillation column. It thus contains 1400 Nm.$^3$/h. (i.e. 49,440 cubic feet per hour) oxygen. 100 Nm.$^3$/h. (i.e., 3,532 cubic feet per hour) oxygen is removed in liquid form from the sump of the distillation column, whilst 2500 Nm.$^3$/h. (i.e., 88,290 cubic feet per hour) vapor with a content of 16% oxygen flows off. The return ratio is thus 3500/2500 equals 1.4.

If the same amount of oxygen—that is, 1400 Nm.$^3$/h. (i.e., 49,440 cubic feet per hour)—were fed to the column in a higher concentration, for example with 50% oxygen in the liquid, this would only require 2800 Nm.$^3$/h. (i.e., 98,885 cubic feet per hour) liquid. When withdrawing 1000 Nm.$^3$/h. (i.e., 3,532 cubic feet per hour) oxygen, only 1800 Nm.$^3$/h. (i.e., 63,569 cubic feet per hour) vapor would flow back and the return ratio would become approximately 1.55.

Accordingly, the invention concerns a method for the separation of a mixture of gases by low temperature rectification with a high cold consumption, for example, for the production of liquefied gaseous separation products, particularly for the production of liquid oxygen or liquid nitrogen in the separation of air, with an at least single-stage work-producing expansion of the gas or a gas separation product to atmospheric pressure, which method is characterized in that a partial gas current, enriched with the product to be obtained, is branched off of the partly liquefied total gas current ahead of the last expansion stage for a part of the gas or gas mixture, and worked up to the pure separation product in a single-column rectifying column without charging wash liquor or injection gas.

In the method according to the invention the compressed gas mixture to be decomposed (that is, separated into its components) is purified in regenerators and cooled. At least a part of the gas mixture is subsequently further cooled by indirect heat-exchange with returning cold gases and at least partly liquefied—if necessary—after having been expanded to a lower pressure. The other part of the gas to be separated is partly heated—if necessary—and subsequently is expanded by work-producing means. By continued cooling in indirect heat-exchange, a part of this gas current is likewise liquefied and then combined with the above described first current in a separator, which, if desired, can have several rectifying plates.

In the production of high-boiling substances a liquid mixture, enriched with high boiling substances, is withdrawn from the total current traversing the separator, is cooled further by indirect heat-exchange and expanded, and thereupon charged to the head of a distilling column. The portion with the lower content of high-boiling substances, which is taken from the separator in gaseous form, is at least partly heated—preferably, in the regenerator—and subsequently is expanded, by work-producing means, to atmospheric pressure and combined with the gas issuing from the distilling column. This total gas current leaves the plant after heat-exchange—preferably, with the arriving gas mixture to be separated. Liquefied high-boiling substances are removed from the base of the distilling column.

In the production of liquefied low-boiling substances the gaseous portion, enriched with low-boiling substances, is fed from the separator to the base of a concentrating column. The liquid portion is evaporated in indirect heat-exchange with condensing low-boiling substances in the head of this concentrating column, and is subsequently used preferably for cooling the gas to be separated before it leaves the plant through the regenerators.

FIGS. 1 to 3, wherein the plants for the production of liquid air separation products are shown schematically and by way of example, illustrate further the method according to the invention. The invention is, however, not limited to these embodiments; in particular, a combination of corresponding parts of the above described plants is possible. Instead of the illustrated regenerators there can also be used—in known manner—reversing-exchangers. For simplicity's sake the regenerators have been represented without the respective reversing valves for a certain switch period. In the following periods the functions are alternated in known manner.

FIG. 1 illustrates a plant for the production of smaller quantities of liquid oxygen from low pressure air. Through the conduit 5 flows about 30,000 Nm.$^3$/h. (i.e., 1,059,480 cubic feet per hour) air at about 4.5 atm. abs. into a regenerator 1 and leaves the latter at a temperature of about 96° K. The air then flows successively through the heat-exchangers 6 and 7. In a separator 8 the liquefied portion—about 3500 Nm.$^3$/h. (i.e., 123,600 cubic feet per hour)—which contains about 40% oxygen, is branched off and withdrawn through a conduit 9, then cooled in a heat-exchanger 11 to about 85° K., and expanded through a valve 12 into the head of a distilling column 13. The point where the current enriched with the product to be obtained is branched off from the total current is identified by a broken circle and designated by the reference numeral 10a.

Liquid oxygen is withdrawn from the base of the column 13 through a conduit 14 and is conducted through the heat-exchanger 6 and to a separator 15. From the latter liquid oxygen—about 1000 Nm.$^3$/h. (i.e., 35,320 cubic feet per hour)—can be withdrawn through a conduit 16. The portion evaporated in heat-exchanger 6 is separated in the separator 15 and returned through a conduit 17 to the distilling column 13.

About 26,000 Nm.$^3$/h. (i.e., 918,215 cubic feet per hour) gas leaves the separator 8 through a conduit 18 and flows at least partly through the lower part of a regenerator 4, wherein the gas is heated. Another portion, whose amount can be regulated by means of a valve 19, flows past the regenerator and combines with the portion of the gas that has passed through the regenerator ahead of a turbine 20. The amount of gas passing through valve 19 can be so adjusted that optimum sublimation conditions prevail in the regenerator.

The gas is expanded in the turbine to 1.2 atm. abs., and then combined with about 2500 Nm.$^3$/h. (i.e., 88,290 cubic feet per hour) gas issuing from the head of the column 13, with a resulting temperature of about 82° K. The issuing gas is heated successively in heat-exchangers 11 and 7 and subsequently leaves the plant through regenerators 2 and 3.

If a part of the oxygen is to be removed in gaseous form, it preferably is withdrawn through a conduit 60 (indicated by broken lines) from the head of the separator 15, is heated in a regenerator 61 and is withdrawn from the plant through a conduit 62.

FIG. 2 represents an air separating plant which also produces liquid oxygen. This plant, however, is operated at a higher pressure, i.e., about 12 atm. abs., because at this pressure the sum of the cold— and reversal losses of an air separating plant is at a minimum.

About 12,800 Nm.$^3$/h. (i.e., 452,045 cubic feet per hour) air flows through a conduit 25, at a pressure of about 12 atm. abs., to a regenerator 21. After the latter the air current is split; about 2,000 Nm.$^3$/h. (i.e., 70,630 cubic feet per hour) flows through a conduit 26 to a heat-exchanger 28, is liquefied and expanded in a valve 29 to about 4 atm. abs. and injected into the upper part of a separator 30. The major part of the air purified in the regenerator 21 and cooled, namely 10,800 Nm.$^3$/h. (i.e., 381,415 cubic feet per hour) is conducted through a conduit 27. Of this current, a part is heated in the colder part of a regenerator 23 and is mixed—in advance of a turbine 32—with unheated air which is regulated by a valve 33. The resulting temperature is about 154° K. The air is then expanded in turbine 32 to about 4 atm. abs., is conducted through a regenerator 34 where it is partly liquefied, and subsequently is introduced into a separator 30. The separator 30 can also include a rectifying column. About 3500 Nm.$^3$/h. (i.e., 123,600 cubic feet per hour) liquid containing about 40% oxygen is withdrawn from the base of the separator 30, conducted through a heat-exchanger 35, expanded through a valve 36 to about 1.3 atm. abs., and charged into a distilling column 31. Through a conduit 37 there is withdrawn 1000 Nm.$^3$/h. (i.e., 3520 cubic feet per hour) liquid oxygen from the base of this column. From the head of the column there is removed about 2500 Nm.$^3$/h. (i.e., 88,290 cubic feet per hour) nitrogen which still contains about 16% oxygen.

From the condenser at the upper end of the separator 30 there is withdrawn, through line 27$^1$, about 8500 Nm.$^3$/h. (i.e., 300,185 cubic feet per hour) nitrogen with a content of about 13% oxygen, which nitrogen product is heated in a heat-exchanger 34 and then fed to an expansion turbine 38. The expanded gas is combined with the top gas arriving from the head of column 31, and the mixture is heated in heat-exchangers 35 and 28 and leaves the plant through a regenerator 22 at ambient temperature. The branch point of the mixture enriched with the substance to be obtained is again indicated by a dot-dashed circle and is designated at 10b. As illustrated in FIG. 2, a part of the first portion of air to be separated may be branched off, after its work-producing expansion in turbine 32, and mixed with the nitrogen product heated in heat-exchanger 34, and the resulting mixture fed to expansion turbine 38.

FIG. 3 shows a gas separating plant wherein the method according to the invention for the production of liquid nitrogen is used.

Through a conduit 56 there flows about 13,000 Nm.$^3$/h. (i.e., 459,110 cubic feet per hour) air, at a pressure of 12 atm. abs., into a regenerator 41 wherein it is cooled and purified. A part—about 900 No.$^3$/h. (i.e., 31,785 cubic feet per hour)—is conducted through a conduit 44 to a heat-exchanger 45 where it is further cooled, is expanded through a valve 46 to about 3 atm. abs., and is fed to a separator 47. The other part of the gas cooled in regenerator 41 flows through a conduit 48 to an expansion turbine 49, wherein it is expanded to about 3 atm. abs. Subsequently, the gas current is split. One part flows through a heat-exchanger 50 where it is cooled and partly liquefied—about 250 Nm.$^3$/h. (i.e., 8,829 cubic feet per hour) liquid being formed—and then conducted to a separator 47.

From the total gas current in separator 47 the mixture, enriched with the substance to be obtained—in this case, nitrogen—is withdrawn at the point 10c indicated by a broken circle, and is conducted to the base of a concentrating column 51.

From the base of the separator 47 there is withdrawn about 2000 Nm.$^3$/h. (i.e., 70,630 cubic feet per hour) liquid containing about 33% oxygen, and this liquid is expanded through a valve 52 to about atmospheric pressure. The liquid is evaporated by indirect heat-exchange with condensing nitrogen in the head of column 51. The gas formed then leaves the plant through regenerator 42, after being heated in heat-exchangers 50 and 45.

About 1000 Nm.$^3$/h. (i.e., 35,320 cubic feet per hour) of the nitrogen condensed in the column 51 can be withdrawn in liquid form through conduit 53. The sump liquid collecting in the column is returned through conduit 54 to the separator 47. A part of the gas expanded in the turbine 49 to about 3 atm. abs., is further expanded in the turbine 55 to about atmospheric pressure and is added after valve 52 to the liquid flowing to the evaporator in the head of column 51.

The plant represented in FIG. 1 operates at the lowest possible pressure. Since the specific output is therefore relatively low, it is not advisable to work according to this diagram if the total amount of oxygen is to be obtained in liquid form. It is suitable particularly when a major part of the oxygen is produced in gaseous form or if there is an increased consumption of cold due to internal compression of oxygen or if the cold consumption of another gas separation is to be covered at the same time.

For delimiting the most favorable methods, the following limits are mentioned:

Double column-apparatus in the present form for a production of up to about 5% oxygen in liquid form.

The method according to the diagram in FIG. 1 is useful for a production of up to 20% oxygen in liquid form.

The method according to the diagram of FIG. 2 is useful for a production of more than 45% oxygen in liquid form.

Intermediate ranges can be bridged over by a corresponding selection of the separation pressure.

I claim:

1. A method of separating air by low temperature rectification with production of oxygen at least partly in liquid form, which comprises liquefying at a superatmospheric pressure a part of the air to be separated—after being cooled and cleaned in a regenerator of a set of regenerators—by recuperative heat exchange with a fraction from the bottom and a fraction from the top of a single stage low pressure rectification column, separating an oxygen-enriched liquid part from a nitrogen-enriched gaseous part; rectifying only the liquid part after being expanded in said low pressure recification column in counterflow to an ascending gas formed by partial evaporation of the rectified liquid part to produce oxygen in pure state to be recovered at least partly in liquid form; and pre-heating the separated gaseous part by heat exchange with air to be separated; work performingly expanding said pre-heated gaseous part, mixing the expanded gas with the top gas of the rectification column and cooling with said mixed gases firstly the separated liquid part to be expanded and rectified and then the air to be at least partly liquefied by recuperative heat exchange before said mixed gases being passed through at least one regenerator of said set of regenerators for cooling and cleaning the air to be seperated, said recuperative heat exchange of the regeneratively cooled and cleaned air to be separated being performed by one part of said regeneratively cooled and cleaned air being branched off and at least partially reheated in one of said regenerators in its last cold period and being work-performingly expanded from a higher pressure to an intermediate pressure, heat exchanging with the separated nitrogen enriched gaseous part coming from an oxygen in the low pressure column evaporating top condenser of a separation room at that intermediate pressure into which said part of the reheated and expanded air is passed after said heat exchange, and being performed by the residual part of said regeneratively cooled and cleaned air being liquefied heat exchanging with top gas of the recification column mixed with said separated nitrogen-enriched gaseous part being preheated and work performingly expanded, said mixed gases having been used to subcool the separated liquid part coming from the bottom of said separation room, said residual other part of the regeneratively cooled and cleaned air being expanded into the upper part of said separation room at an intermediate pressure.

2. A method according to claim 1, in which the air to be separated is regeneratively cooled at a pressure between 10 and 18 atmospheres absolute, preferably between 12 and 14 atmospheres absolute, by the separated residual mixed gases the intermediate pressure in the separating room being about 4 atmospheres absolute.

References Cited by the Examiner

UNITED STATES PATENTS

| | | | |
|---|---|---|---|
| 1,510,178 | 9/24 | Lechmann | 62—42 |
| 1,562,915 | 11/25 | Recordon | 62—42 |
| 2,040,116 | 5/36 | Wilkinson | 62—39 X |
| 2,134,700 | 11/38 | Brewster | 62—39 X |
| 2,134,702 | 11/38 | Brewster | 62—39 X |
| 2,265,558 | 12/41 | Ward | 62—23 |
| 2,413,752 | 1/47 | Dennis | 62—15 X |
| 2,431,866 | 12/47 | Dennis | 62—24 |
| 2,587,820 | 3/52 | Cartier | 62—42 |
| 2,622,416 | 12/52 | Ogorzaly | 62—29 X |
| 2,648,205 | 8/53 | Hufnagel | 62—29 |
| 2,673,456 | 3/54 | Scharmann | 62—13 |
| 2,699,047 | 1/55 | Karwat | 62—13 |
| 2,709,348 | 5/55 | Yendall | 62-14 |
| 2,728,205 | 12/55 | Becker | 62—24 |
| 2,737,784 | 3/56 | Becher | 62—14 X |
| 2,880,592 | 4/59 | Davison. | |
| 2,924,078 | 2/60 | Taunoda | 62—38 |
| 2,932,174 | 4/60 | Schilling | 62—13 |
| 2,939,293 | 6/60 | Green | 62—28 X |

FOREIGN PATENTS

| | | |
|---|---|---|
| 1,065,725 | 1/54 | France. |
| 951,875 | 11/56 | Germany. |

NORMAN YUDKOFF, *Primary Examiner.*

RICHARD A. O'LEARY, *Examiner.*